US00RE40593E

(19) United States
(12) Reissued Patent
Walters et al.

(10) Patent Number: US RE40,593 E
(45) Date of Reissued Patent: *Dec. 2, 2008

(54) MULTI-PHASE CONVERTER WITH BALANCED CURRENTS

(75) Inventors: Michael M. Walters, Apex, NC (US); Charles E. Hawkes, Cary, NC (US); Robert H. Isham, Flemington, NJ (US)

(73) Assignee: Intersil Americas Inc., Milpitas, CA (US)

( * ) Notice: This patent is subject to a terminal disclaimer.

(21) Appl. No.: 11/258,589

(22) Filed: Oct. 24, 2005

Related U.S. Patent Documents

Reissue of:
(64) Patent No.: 6,278,263
Issued: Aug. 21, 2001
Appl. No.: 09/591,404
Filed: Jun. 12, 2000

U.S. Applications:
(63) Continuation of application No. 10/375,926, filed on Feb. 26, 2003, now Pat. No. Re. 38,846, which is a continuation of application No. 10/044,479, filed on Jan. 11, 2002, now Pat. No. Re. 38,454.
(60) Provisional application No. 60/151,982, filed on Sep. 1, 1999.

(51) Int. Cl.
*G05F 1/59* (2006.01)
*G05F 1/40* (2006.01)

(52) U.S. Cl. ..... 323/272; 323/285
(58) Field of Classification Search ..... 323/224, 323/225, 268, 271, 272, 282, 284, 285
See application file for complete search history.

(56) References Cited

U.S. PATENT DOCUMENTS 5,793,191 A * 8/1998 Elmore et al. ..... 323/272
6,137,274 A * 10/2000 Rajagopalan ..... 323/272
6,465,993 B1 * 10/2002 Clarkin et al. ..... 323/272
RE38,454 E * 3/2004 Walters et al. ..... 323/272
RE38,846 E * 10/2005 Walters et al. ..... 323/272

OTHER PUBLICATIONS

Semitech, "Programmable, High Performance Multi–Phase, PWM Controller SC 1144", Semitech, 1999, p. 1–11, Jul. 7, 1999.*

(Continued)

*Primary Examiner*—Gary L Laxton
(74) *Attorney, Agent, or Firm*—Fogg & Powers LLC

(57) ABSTRACT

A multi-phase DC/DC converter having an output voltage and including a plurality of converter channels. Each converter channel includes a converter channel input and a converter channel output. Each converter channel is configured for generating a converter channel current and for adjusting said converter channel current in response to a control signal electrically connected to each converter channel input. A control circuit generates an error signal representative of a comparison of the converter output voltage to a reference voltage. The control circuit includes a plurality of control circuit channels, each of which correspond to a converter channel. Each control circuit channel generates a channel current signal representative of a corresponding converter channel current, and generates a differential channel current signal representative of a comparison of the channel current signal to an average current signal. The average current signal is representative of an overall average current for the converter channels. Each control circuit channel generates a differential error signal representative of a comparison of the error signal to the differential channel current signal. Each control circuit channel includes a pulse width modulator having a ramp input and a control input. The control input is electrically connected to the differential error signal. The pulse width modulator generates the control signal based upon the differential error signal. The control signal is electrically coupled to a corresponding converter channel input. The control circuit generates the average current signal.

8 Claims, 2 Drawing Sheets

OTHER PUBLICATIONS

Harris Semiconductor Corporation, "Microprocessor Core Voltage Regulator Multi–Phase Buck PWM Controller HIP6301", Harris Semiconductor Corporation, 1999, p. 1–8, Jul. 1999.*

Harris Semiconductro Corporation, "Multi–Phase Buck Technology", Harris Semiconductor Corporation, 1999, p. 1–12, Apr. 4, 1999.*

* cited by examiner

MULTI-PHASE CONVERTER WITH BALANCED CURRENTS

Matter enclosed in heavy brackets [ ] appears in the original patent but forms no part of this reissue specification; matter printed in italics indicates the additions made by reissue.

CROSS-REFERENCE TO RELATED APPLICATIONS

[This application claims the benefit of U.S. Provisional Application No. 60/151,982, filed Sep. 1, 1999.] *Notice: More than one reissue application has been filed for the reissue of U.S. Pat. No. 6,278,263. The reissue applications are reissue application Ser. No. 10/044,479* (*now U.S. Pat. RE* 38,454) (*the grandparent reissue*); *reissue application Ser. No. 10/375,926* (*now U.S. Pat. RE* 38,846) (*the parent, continuation reissue application*); *and reissue application Ser. No. 11/258,589* (*the present, continuation reissue application*). *All three Reissue applications are reissues of the same U.S. Pat. No. 6,278,263.*

*This reissue Application claims the benefit of U.S. Provisional Patent Application Ser. No. 60/151,982, filed Sep. 1, 1999.*

FIELD OF THE INVENTION

The present invention relates to an apparatus and method for balancing the individual channel currents in a multi-phase DC/DC converter.

DESCRIPTION OF THE RELATED ART

There are no known prior art devices of methods that specifically balance the channel currents of multi-phase converters.

Personal computers have direct current (DC) power supplies to regulate their operating voltage and current. Early personal computers operated their circuits at ±5 volts and drew several amps of current. In order to speed-up performance, operating voltages were dropped to the range of ±1.5 to 1.0 volts and currents have risen to 50 or more amps. It is more economical to provide the 50 or more amps from several power sources rather than from a single source. This has led many power supply manufacturers to provide multi-phase converters with two or more current channels. While there are more component parts in multi-phase systems, the parts themselves are smaller and typically less expensive than the high-power parts which must be used in a single-converter having similar current capabilities.

When multi-phase converters supply the same load there is often a voltage mismatch between the channels. If two or more channels have even slightly different output voltages, current will flow mostly from the channels with the highest voltage. Some converters have the ability to sink as well as source output current. In those converters, current may flow from one channel to another, regardless of load current. This can lead to excessive power dissipation. Additionally, the load that these converters supply must be limited below the combined full load capability of the individual channel.

Without the capability to share the load current, each converter channel provides a current proportional to the average phase voltage and the net converter resistance. The average phase voltage is approximated by:

$$V_{PH}=(V_{IN}-V_{UP})\cdot D-V_{LOW}(1-D)$$

where:

$V_{IN}$ is the input voltage, $V_{UP}$ is the voltage drop across the upper switch, $V_{LOW}$ is the voltage across the lower switch; and D is the duty cycle.

The net converter resistance includes the summation of the inductor winding resistance, any trace resistance, and the time multiplexed resistance of the upper and lower power switches.

In multi-phase converters, the ability to equally share the load current depends upon the matching of parameters and components between each of the phases or channels. Current sharing is particularly sensitive to any duty cycle mismatch between channels. Matching the duty cycle of multiple phases is difficult because of inherent component mismatches that can induce timing errors. As a result, any channel may be forced to carry significantly more than its proportional share of the load current. For example, in a four-phase converter with four converter channels, one channel may carry 40% of the load current while the other channels each carry 20%, rather than each channel carrying the ideal 25%. Thus, each channel must be sized to carry at least 40% of the projected output current, or 15% more than its proportionate share. Designing each of the four channels for 40% of the projected output current, rather than for 25% of the projected output current, requires the use of oversized power output transistors and passive components, such as, for example, inductors and resistors, in order for each channel to safely conduct a higher proportion of load current. Since the distribution of the load varies, each power transistor must be larger than needed for the total load. However, if the load is more evenly distributed smaller transistors as well as smaller passive components can be used to achieve the same load current capability as oversized prior art systems. Smaller transistor and passive components are less expensive and more efficient than larger, higher-power components.

Therefore, what is needed in the art is a multi-phase converter which equally shares the load current between each of the phases or channels.

Furthermore, what is needed in the art is a multi-phase converter which uses smaller transistors and smaller passive components to produce a given load current capability, thereby making it less expensive to produce and sell.

SUMMARY OF THE INVENTION

The present invention provides an apparatus and method for balancing the channel currents in a multi-phase DC/DC converter.

The invention comprises, in one form thereof, a multi-phase DC/DC converter having an output voltage and including a plurality of converter channels. Each converter channel includes a converter channel input and a converter channel output. Each converter channel is configured for generating a converter channel current and for adjusting said converter channel current in response to a control signal electrically connected to each converter channel input. A control circuit generates an error signal representative of a comparison of the converter output voltage to a reference voltage. The control circuit includes a plurality of control circuit channels, each of which correspond to a converter channel. Each control circuit channel generates a channel current signal representative of a corresponding converter channel current, and generates a differential channel current signal representative of a comparison of the channel current signal to an average current signal. The average current signal is representative of an overall average current for the converter channels. Each control circuit channel generates a differential error signal representative of a comparison of the error signal to the differential channel current signal. Each control circuit channel includes a pulse width modulator having a ramp input and a control input. The control input is electrically connected to the differential error signal. The pulse width modulator generates the control signal based upon the differential error signal. The control signal is electrically coupled to a corresponding converter channel input. The control circuit generates the average current signal.

BRIEF DESCRIPTION OF THE DRAWINGS

The above-mentioned and other features and advantages of this invention, and the manner of attaining them, will become apparent and be better understood by reference to the following description of one embodiment of the invention in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE DRAWINGS

Generally, the multi-phase converter of the present invention has multiple converter channels to source the load current. Each converter channel can be considered as an independent converter, and is controlled by a pulse-width modulated (PWM) signal. For this discussion, each converter channel is a buck converter or synchronous-rectified buck converter. The converters may share a common output capacitance.

Figure 1:
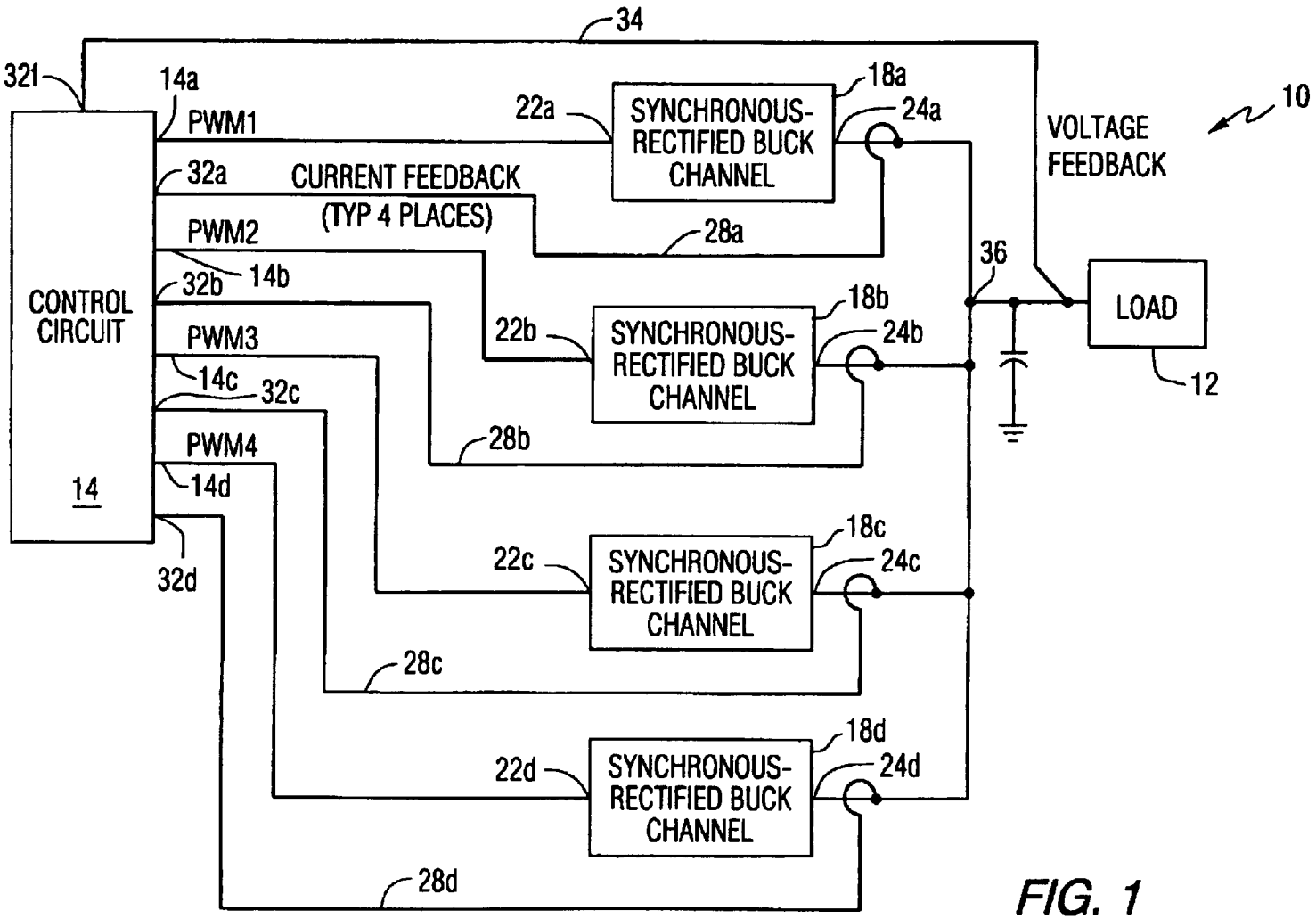
FIG. 1 is a block diagram of a four-phase, four-channel converter.

Referring now to the drawings, and particularly to FIG. 1, there is shown one embodiment of a 4-channel multi-phase converter 10 of the present invention. Converter 10 drives load 12 and includes control circuit 14. Interconnected electrically between load 12 and control circuit 14 are, for example, four synchronous-rectified buck channels or converter channels 18a, 18b, 18c, 18d. More particularly, each converter channel 18a, 18b, 18c, 18d includes a respective converter channel input 22a, 22b, 22c, 22d. Control circuit 14 includes four control circuit outputs 14a, 14b, 14c, 14d, each of which are electrically connected to a respective one of converter channel inputs 22a, 22b, 22c, 22d. Each converter channel 18a, 18b, 18c, 18d further includes a respective converter channel output 24a, 24b, 24c, 24d, through which flows a respective converter channel current. Control circuit 14 provides at each output 14a, 14b, 14c, 14d, a separate and independent PWM signal, PWM1, PWM2, PWM3, PWM4, to each converter channel input 22a, 22b, 22c, 22d. The four PWM signals regulate the current flowing through each converter channel output 24a, 24b, 24c, 24d.

As will be described more particularly hereinafter, the output currents of converter channels 18a, 18b, 18c, 18d, are separately and individually fed back to control circuit 14. The individual PWM signals PWM1, PWM2, PWM3, PWM4 at each control circuit output 14a, 14b, 14c, 14d, respectively, are modified based at least in part upon the fed-back converter channel current. The modified or adjusted individual PWM signals PWM1, PWM2, PWM3, PWM4 are provided to each converter channel input 22a, 22b, 22c, 22d. More particularly, control circuit 14 includes current feedback lines 28a, 28b, 28c, 28d which electrically connect a respective one of converter channel outputs 24a, 24b, 24c, 24d to a respective one of control circuit inputs 32a, 32b, 32c, 32d. Thus, each of current feedback lines 28a, 28b, 28c, 28d provide a current feedback path for each of the converter channel currents flowing through converter channels 18a, 18b, 18c, and 18d, respectively. Each of feedback lines 28a, 28b, 28c, 28d, are considered as forming a part of four separate control circuit channels.

It is preferred to use a feedback method that provides a separate feedback signal from each of converter channels 18a, 18b, 18c, 18d to each control circuit channel. The separate feedback signals are each proportional to the converter channel current being sourced by a corresponding converter channel. The operation of each channel 18a, 18b, 18c, 18d is then individually and separately adjusted on the basis of the fed-back converter channel current to balance the converter channel currents relative to each other. Providing to each control circuit channel a feedback signal that is proportional to the current being sourced by a corresponding converter channel eliminates issues with component mismatch between the converter channels. Generally, and as will be described with more particularity hereinafter, converter 10 subtracts from an error amplifier's output a signal that is proportional to the converter current imbalance existing between the converter channels to thereby correct for any imbalance between the converter currents.

Feed back path 34 electrically connects output 36 of converter 10 to feedback input 32f of control circuit 14. Control circuit 14 thus receives via feed back path 34 the voltage being supplied to load 12.

Figure 2:
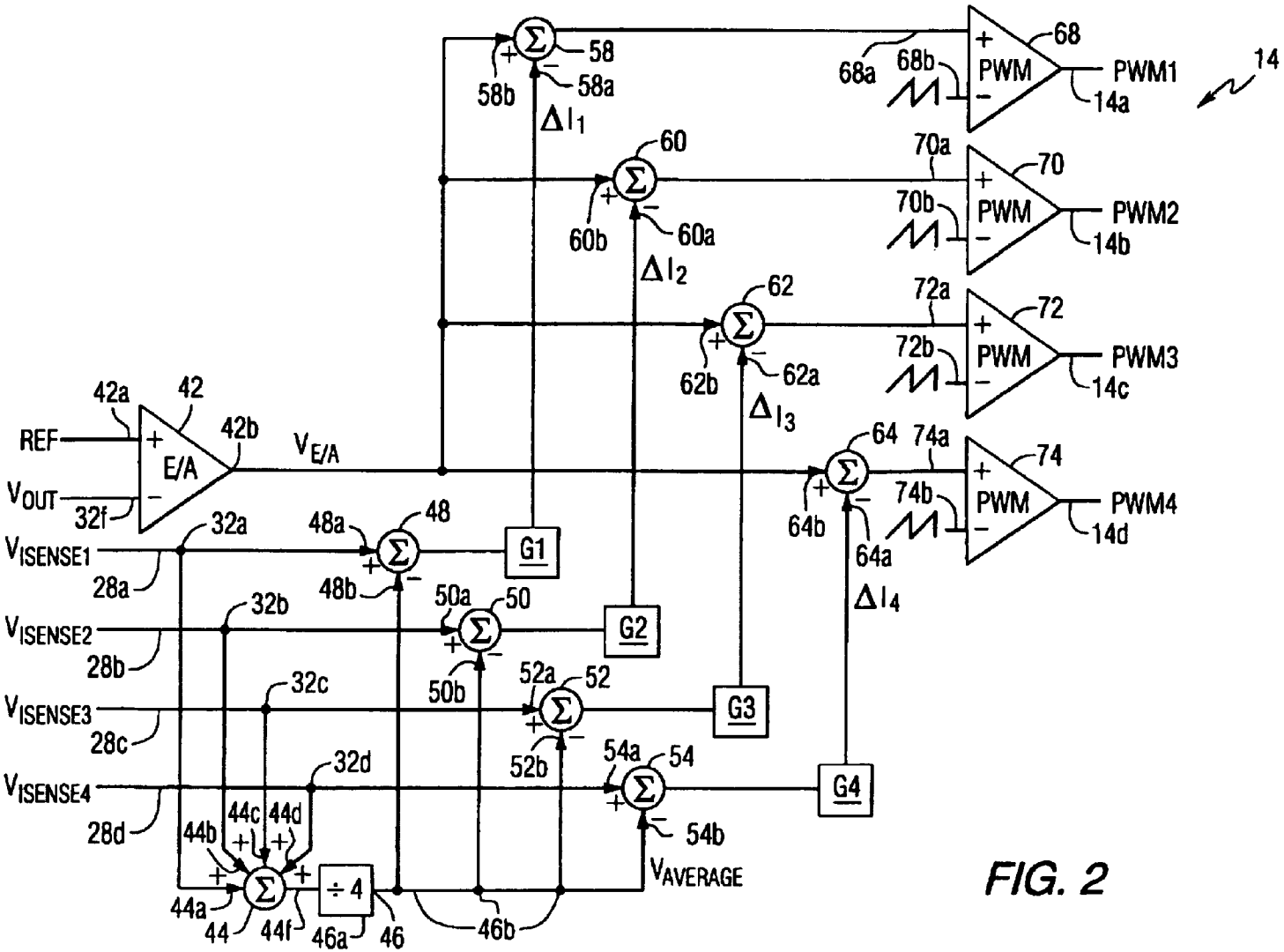
FIG. 2 shows the control circuit for the four-channel converter system in FIG. 1.

Referring now to FIG. 2, control circuit 14 is shown in more detail. Generally, and as will be described with more particularity hereinafter, the converter channel current of each converter channel 18a, 18b, 18c, 18d is individually compared to the overall average converter channel current of all the converter channels 18a, 18b, 18c, and 18d. The current of each converter channel 18a, 18b, 18c, 18d is then individually and separately adjusted to bring it closer to the average and, therefore, making the converter channel current in each of converter channels 18a, 18b, 18c, 18d substantially equal to each other.

Error amplifier (E/A) 42 has a first input 32f electrically connected via feedback path 34 to output 36 of converter 10. E/A 42 compares the voltage at converter output 36, or the load voltage, to a reference voltage REF electrically connected to input 42a of error amplifier 42. The output voltage VE/A appearing on output 42b of E/A 42 increases when the voltage at output 36 of converter 10 is below the reference voltage applied to input 42a of E/A 42. Conversely, the output voltage VE/A appearing on output 42b of E/A 42 decreases when the voltage at output 36 of converter 10 is above the reference voltage applied to input 42a of E/A 42. The current flowing from each converter channel output 24a, 24b, 24c, 24d flows through a series resistor (not shown) in each of current feedback paths 28a, 28b, 28c, 28d to thereby create $V_{ISENSE1}$, $V_{ISENSE2}$, $V_{ISENSE3}$, and $V_{ISENSE4}$, respectively. Each of $V_{ISENSE1}$, $V_{ISENSE2}$, $V_{ISENSE3}$, and $V_{ISENSE4}$, is proportional to the individual converter channel current flowing through converter channel outputs 24a, 24b, 24c, 24d, respectively. Each of $V_{ISENSE1}$, $V_{ISENSE2}$, $V_{ISENSE3}$, and $V_{ISENSE4}$, is electrically connected to control circuit 14 via feedback paths 28a, 28b, 28c, 28d, respectively. However, it is to be understood that the series resistor may be integrated within control circuit 14, in which case feedback paths 28a, 28b, 28c, 28d would deliver the converter channel currents flowing through converter channel outputs 24a, 24b, 24c, 24d, respectively, and in which case $V_{ISENSE1}$, $V_{ISENSE2}$, $V_{ISENSE3}$, and $V_{ISENSE4}$ would be created internally of control circuit 14.

Summing circuit 44 includes inputs 44a, 44b, 44c, 44d, each of which are electrically connected to control circuit inputs 32a, 32b, 32c, 32d, thereby connecting inputs 44a, 44b, 44c, 44d of summing circuit 44 to $V_{ISENSE1}$, $V_{ISENSE2}$, $V_{ISENSE3}$, $V_{ISENSE4}$, respectively. Summing circuit 44 adds together each of $V_{ISENSE1}$, $V_{ISENSE2}$, $V_{ISENSE3}$, and $V_{ISENSE4}$, and produces a signal proportional to the sum of $V_{ISENSE1}$, $V_{ISENSE2}$, $V_{ISENSE3}$, and $V_{ISENSE4}$ at output 44f. Output 44f of summing circuit 44 is electrically connected to input 46a of scaling circuit 46. Scaling circuit 46 scales (i.e., divides by 4) the sum of $V_{ISENSE1}$, $V_{ISENSE2}$, $V_{ISENSE3}$, and $V_{ISENSE4}$ to thereby produce signal $V_{average}$, which is proportional to the average of $V_{ISENSE1}$, $V_{ISENSE2}$, $V_{ISENSE3}$, and $V_{ISENSE4}$, at output 46b.

Each control circuit channel includes a respective subtraction circuit 48, 50, 52, 54. Each of subtraction circuits 48, 50, 52, 54 include inputs 48a and 48b, 50a and 50b, 52a and 52b, and 54a and 54b, respectively. Input 48a of subtraction circuit 48 is electrically connected to input 32a of control circuit 14, thereby connecting input 48a of subtraction circuit 48 to $V_{ISENSE1}$. Input 50a of subtraction circuit 50 is electrically connected to input 32b of control circuit 14, thereby connecting input 50a of subtraction circuit 48 to $V_{ISENSE2}$. Input 52a of subtraction circuit 52 is electrically connected to input 32c of control circuit 14, thereby connecting input 52a of subtraction circuit 48 to $V_{ISENSE2}$. Likewise, input 54a of subtraction circuit 54 is electrically connected to input 32d of control circuit 14, thereby connecting input 54a of subtraction circuit 48 to $V_{ISENSE4}$. Each input 48b, 50b, 52b, and 54b of subtraction circuits 48, 50, 52, 54, respectively, is electrically connected to output 46b of scaling circuit 46, thereby connecting each input 48b, 50b, 52b, 54b to $V_{average}$. Each of the subtraction circuits 48, 50, 52, 54, subtracts $V_{average}$ from each of $V_{ISENSE1}$, $V_{ISENSE2}$, $V_{ISENSE3}$, and $V_{ISENSE4}$. More particularly, subtraction circuit 48 subtracts $V_{average}$ from $V_{ISENSE1}$, subtraction circuit 50 subtracts $V_{average}$ from $V_{ISENSE2}$, subtraction circuit 52 subtracts $V_{average}$ from $V_{ISENSE3}$, and subtraction circuit 54 subtracts $V_{average}$ from $V_{ISENSE4}$. The results of the subtraction performed by each of subtraction amplifiers 48, 50, 52, 54 represent the difference between the current flowing through a respective one of converter channels 18a, 18b, 18c, 18d and the average of the converter channel currents being sourced conjunctively by converter channels 18a, 18b, 18c, 18d (i.e., the value represented by $V_{average}$). Outputs 48c, 50c, 52c, and 54c of subtraction circuits 48, 50, 52, 54, respectively, are electrically connected to a respective one of compensation circuits G.

Each control circuit channel also includes a compensation circuit G1, G2, G3, G4. Each compensation circuit G1, G2, G3, G4 performs current loop compensation functions, such as, for example, gain or filter functions to shape the current feedback wave, to achieve adequate current balancing, or to prevent current loop instability. Each compensation circuit G1, G2, G3, G4 may include at least one pole and zero. The output of each compensation circuit G1, G2, G3, G4 represents the difference between the current flowing through a respective one of converter channels 18a, 18b, 18c, 18d and the overall average of the converter channel currents being sourced conjunctively by converter channels 18a, 18b, 18c, 18d (i.e., the value represented by $V_{average}$), and is represented by signals $\Delta I_1$, $\Delta I_2$, $\Delta I_3$, $\Delta_4$, respectively. Thus, signals $\Delta I_1$, $\Delta I_2$, $\Delta I_3$, $\Delta I_4$ represent the difference between the overall average of the converter channel currents being sourced conjunctively by converter channels 18a, 18b, 18c, 18d (i.e., the value represented by $V_{average}$) and the actual value of the current flowing within converter channels 18a, 18b, 18c, and 18d, respectively. More particularly, and for example, $\Delta I_1$ represents the difference between the overall average of the converter channel currents being sourced conjunctively by channels 18a, 18b, 18c, 18d, and the actual value of the converter channel current flowing within converter channel 18a. Likewise, and as a further example, $\Delta I_2$ represents the difference between the overall average of the converter channel currents being sourced conjunctively by converter channels 18a, 18b, 18c, 18d, and the actual value of the current flowing within converter channel 18b. Ideally, each of the $\Delta I_1$, $\Delta I_2$, $\Delta I_3$, and $\Delta I_4$ signals will be zero, thus indicating equal converter channel currents are flowing through each of converter channels 18a, 18b, 18c, 18d. Signals $\Delta I_1$, $\Delta I_2$, $\Delta I_3$, $\Delta I_4$ are input into subtraction circuits 58, 60, 62, 64, respectively.

Each control circuit channel includes a subtraction circuit 58, 60, 62, 64. Each of subtraction circuits 58, 60, 62, 64 include respective inputs 58a and 58b, 60a and 60b, 62a and 62b, and 64a and 64b. Inputs 58a, 60a, 62a, and 64a are electrically connected to G1, G2, G3, and G4, respectively, thereby connecting each of subtraction circuits 58, 60, 62, and 64 to signals $\Delta I_1$, $\Delta I_2$, $\Delta I_3$, $\Delta I_4$, respectively. Each of inputs 58b, 60b, 62b, and 64b, are electrically connected to output 42b of E/A 42, thereby connecting each subtraction circuit 58, 60, 62, and 64 to VE/A. As described hereinabove, VE/A increases when the voltage at output 36 of converter 10 is below the reference voltage REF applied to input 42a of E/A 42. Conversely, the output voltage VE/A of output 42b decreases when the voltage at output 36 of converter 10 is above the reference voltage REF applied to input 42a of E/A 42. Difference or subtraction circuits 58, 60, 62, and 64 compare a respective one of $\Delta I_1$, $\Delta I_2$, $\Delta I_3$, and $\Delta I_4$ to signal VE/A. Outputs 58c, 60c, 62c, and 64c of subtraction circuits 58, 60, 62, 64, respectively, are electrically connected to a respective one of PWM amplifiers 68, 70, 72, 74.

Each control circuit channel includes a PWM amplifier 68, 70, 72, 74. Each of PWM amplifiers 68, 70, 72, 74 include inputs 68a and 68b, 70a and 70b, 72a and 72b, and 74a and 74b, respectively. Inputs 68a, 70a, 72a, 74a are electrically connected to outputs 58c, 60c, 62c, 64c, respectively, of subtraction circuits 58, 60, 62, 64, respectively. Each input 68b, 70b, 72b, 74b is connected to a reference PWM waveform. PWM amplifiers 68, 70, 72, 74 modify the reference PWM waveform dependent at least in part upon inputs 68a, 70a, 72a, 74a, respectively. More particularly, the pulse width of the reference PWM will be individually and separately modified by each PWM amplifier 68, 70, 72, 74 dependent at least in part upon a respective one of inputs 68a, 70a, 72a, 74a. The individually and separately modified reference PWM waveforms appear at control circuit outputs 14a, 14b, 14c, 14d of PWM amplifiers 68, 70, 72, 74, respectively, as signal PWM1, PWM2, PWM3, and PWM4, respectively. The modification of the reference PWM waveform by each PWM amplifier 68, 70, 72, and 74 is in such a direction as to bring the converter channel current of each converter channel 18a, 18b, 18c, 18d closer to the average output current, $V_{average}$. More particularly, the pulse width of each of signals PWM1, PWM2, PWM3, PWM4, will be modified (i.e. shortened or lengthened) in such a direction as to bring the converter channel current of each converter channel 18a, 18b, 18c, 18d closer to the average output current, $V_{average}$. Each signal PWM1, PWM2, PWM3, and PWM4 of PWM amplifiers 68, 70, 72, 74, respectively, is electrically connected to a respective one of converter channel inputs 22a, 22b, 22c, and 22d, respectively, as described hereinabove.

In use, when converter 10 is operating under, for example, the condition that converter channel 18a is carrying a converter channel current that is higher than the average of all converter channel currents, as represented by $V_{average}$, subtraction circuit 48 will generate a positive $\Delta I_1$ signal. This positive $\Delta I_1$ is input into subtraction circuit 58. Subtraction circuit 58 subtracts the positive $\Delta I_1$ signal from VE/A, i.e. the output of error amplifier 42, thereby reducing output 58c, which is electrically connected to input 68a of PWM 68. In response, PWM 68 reduces the pulse width of PWM1 at output 14a. The reduction in pulse width of PWM1 reduces the converter channel current flowing through converter channel 18a to a value closer to the average of all converter channel currents, as represented by $V_{average}$. Conversely, when converter 10 is operating under, for example, the condition that converter channel 18b is carrying a converter channel current that is lower than the average of all converter channel currents, as represented by $V_{average}$, a negative $\Delta I_2$ signal is generated by subtraction circuit 50. This negative $\Delta I_2$ signal is input into subtraction circuit 60. Subtraction circuit 60 subtracts the negative $\Delta I_2$ signal from VE/A, i.e. the output of error amplifier 42, and the output 60c, which is electrically connected to input 70a of PWM 70, is increased. In response, PWM 70 increases the pulse width of PWM2 at output 14b. The increase in pulse width of PWM2 increases the current flowing through channel 18b to a value closer to the average of all converter channel currents, as represented by $V_{average}$.

In the embodiment shown, converter 10 includes four converter channels 18a, 18b, 18c, 18d, and control circuit 14 includes four control circuit channels, each including a respective subtraction circuit 48, 50, 52, 54, another respective subtraction circuit 58, 60, 62, 64, a respective compensation circuit G1, G2, G3, G4, a respective PWM amplifier 68, 70, 72, 74, and a respective feedback path 28a, 28b, 28c, 28d. However, it is to be understood that converter 10 can be configured to include any number of channels with control circuit 14 be configured with a corresponding number of control circuit channels.

In the embodiment shown, compensation circuits G1, G2, G3, G4 each perform current loop compensation functions, such as, for example, gain or filter functions to shape the current feedback wave, or to prevent current loop instability. However, it is to be understood that it is not always necessary to incorporate compensation circuits into the present invention.

In the embodiment shown, signals $V_{ISENSE1}$, $V_{ISENSE2}$, $V_{ISENSE3}$, and $V_{ISENSE4}$ are proportional to the current in each of feedback loops 28a, 28b, 28c, 28d, respectively. However, it is to be understood that the $V_{ISENSE}$ signals may be alternately configured such as being based upon or based partly upon the current carried by the feedback loops, rather than being strictly proportional thereto.

In the embodiment shown, circuits 48, 50, 52, 54, and circuits 58, 60, 62, 64 are configured as subtraction circuits. However, it is to be understood that each of circuits 48, 50, 52, 54, and circuits 58, 60, 62, 64 could be alternatively configured, such as, for example, difference amplifiers, to produce an output signal representative of the difference between signals input into the circuits.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed:

[1. A multi-phase DC/DC converter having an output voltage, said converter comprising:

a plurality of converter channels, each of said plurality of converter channels including a converter channel input and a converter channel output, each of said plurality of converter channels being configured for generating a converter channel current and for adjusting said converter channel current in response to a control signal electrically connected to each said converter channel input;

a control circuit, comprising:

means for generating an error signal, said error signal being representative of a comparison of said output voltage to a reference voltage;

a plurality of control circuit channels, each of said plurality of control circuit channels corresponding to one of said plurality of converter channels, each of said plurality of control circuit channels comprising:

means for generating a channel current signal, said channel current signal being representative of a corresponding converter channel current;

means for generating a differential channel current signal, said differential channel current signal being representative of a comparison of said channel current signal to an average current signal, said average current signal being representative of an overall average current for said plurality of converter channels;

means for generating a differential error signal, said differential error signal being representative of a comparison of said error signal to said differential channel current signal; and a pulse width modulator having a ramp input and a control input, said control input being electrically connected to said differential error signal, said pulse width modulator configured for generating said control signal, said control signal being based at least in part upon said differential error signal, said control signal being electrically coupled to a corresponding said converter channel input; and means for generating said average current signal.]

[2. The multi-phase DC/DC converter of claim 1, wherein each of said plurality of control circuit channels further includes a respective compensation circuit.]

[3. The multi-phase DC/DC converter of claim 2, wherein each said compensation circuit comprises a frequency compensation circuit having at least one pole and zero, said frequency compensation circuit being configured for at least one of optimizing and stabilizing said differential channel current signal.]

[4. The multi-phase DC/DC converter of claim 1, wherein said means for generating a differential channel current signal comprises a first subtracting circuit configured for subtracting said channel current signal from said average current signal.]

[5. The multi-phase DC/DC converter of claim 1, wherein each means for generating an error signal comprises an error amplifier having a first input and a second input, said first input being electrically connected to said first input, said second input being electrically connected to a reference voltage.]

[6. The multi-phase DC/DC converter of claim 1, wherein each means for generating a different error signal comprises a second subtracting circuit configured for subtracting said error signal from said differential channel current signal.]

[7. The multi-phase DC/DC converter of claim 1, wherein each of said plurality of control circuit channels includes a control circuit channel input, said means for generating a channel current signal comprises a current feedback path, said current feedback path electrically coupling said control circuit channel input to a corresponding said converter channel output.]

[8. The multi-phase DC/DC converter of claim 1, wherein said means for generating said average current signal comprises a scaling circuit and a summing circuit electrically connected to said scaling circuit, said summing circuit configured for adding together each respective said channel current signal and for generating a sum signal representative thereof, said scaling circuit configured for scaling said sum signal and for generating said average current signal.]

[9. A method of balancing a plurality of channel currents, each of said plurality of channel currents flowing in a corresponding one of a plurality of channels in a multi-phase DC/DC converter, said DC/DC converter having an output voltage, said method comprising the steps of: sensing each of said plurality of channel currents to thereby determine a plurality of channel current signals;

averaging together said plurality of channel current signals to thereby determine an average channel current signal;

comparing each of said plurality of channel current signals to said average channel current signal to thereby determine a respective differential channel current signal for each of said plurality of channels;

further comparing said output voltage to a reference voltage to thereby determine an error signal;

furthermore comparing each said differential channel current signal to said error signal to thereby determine a respective differential error signal for each of said plurality of channels; and adjusting each of said plurality of channel currents based at least in part upon a corresponding said differential error signal to thereby make each of said plurality of channel currents substantially equal to each other.]

[10. The method of claim 9, comprising the further step of stabilizing sand optimizing said differential channel current signal.]

[11. The method of claim 10, wherein said stabilizing and optimizing step comprises filtering each said differential channel current signal with a frequency compensation circuit, said frequency compensation circuit having at least one pole and zero.]

[12. The method of claim 9, wherein said averaging step comprises:

adding with a summing circuit each of said plurality of channel current signals to thereby produce a summing signal; and scaling said summing signal with a scaling circuit to thereby produce said average channel current signal.]

[13. The method of claim 9, wherein said comparing step comprises subtracting with a subtracting circuit said average channel current signal from each of said plurality of channel.]

[14. The method of claim 9, wherein said further comparing step comprises subtracting with a subtracting circuit said reference voltage from said output voltage of said converter.]

[15. The method of claim 9, wherein said furthermore comparing step comprises subtracting with a subtracting circuit said error signal from each said differential channel current signal.]

[16. The method of claim 9, wherein said adjusting step comprises electrically coupling a respective one of each said differential error signal to an input of a corresponding pulse width modulator, each said pulse width modulator configured for issuing a control signal, each said control signal based at least in part upon a corresponding said differential error signal, each said control signal being electrically coupled to a corresponding one of said plurality of channels, each of said plurality of channels being configured for adjusting a corresponding one of said plurality of channel currents based at least in part upon said control signal to thereby make each of said plurality of channel currents substantially equal to each other.]

[17. A multi-phase DC/DC converter, comprising:

a converter output;

a plurality of converter channels, each of said plurality of converter channels having a respective converter channel input and a respective converter channel output, each said converter channel output being electrically connected to said converter output, each of said plurality of converter channels being configured for sourcing a respective channel current, each of said plurality of converter channels being configured to adjust a corresponding said channel current in response to a control signal electrically connected to a corresponding said converter channel input; and a control circuit, comprising:

a summing circuit having a plurality of summing circuit inputs and a summing circuit output;

a plurality of current feedback paths, each of said plurality of current feedback paths electrically connecting a respective said converter channel output to a corresponding one of said plurality of summing circuit inputs;

a scaling circuit having a scaling input and a scaling output, said scaling input being electrically connected to said sing circuit output;

a plurality of first subtraction circuits each having a first input, a second input and a first subtraction circuit output, each said second input being electrically connected to said scaling output, each said first input being electrically connected to a corresponding one of said plurality of current feedback paths;

an error amplifier having a reference input, an error input, and an error output, said reference input being electrically connected to a reference voltage;

a voltage feedback path connecting said converter output to said error input of said error amplifier;

a plurality of second subtraction circuits each having a first input, a second input and a second subtraction circuit output, each said first input being electrically connected to said error output, each said second input being electrically connected to a corresponding said first subtraction circuit output; and a plurality of pulse width modulators each having a ramp input, a control input, and a pulse width modulator output, each said control input being electrically connected to a corresponding said second subtraction circuit output, each said ramp input being connected to a ramp voltage source, each said pulse width modulator output being electrically connected to a corresponding said converter channel input.]

[18. The DC/DC converter of claim 17, further comprising a plurality of frequency compensation circuits each having an input and an output, each said input being electrically connected to a corresponding said first subtraction circuit output, each said output being electrically connected to a corresponding said second input of one of said plurality of said second subtraction circuits.]

*19. A method of balancing a plurality of channel currents of a plurality of channels in a multi-phase DC/DC converter having an output voltage, the method comprising:*

*receiving a plurality of channel current signals, each of the plurality of channel current signals representative of a channel current from one of the plurality of channels;*

*adding the plurality of channel current signals together to obtain a cumulative current signal;*

*scaling the cumulative current signal to obtain one or more scaled channel current signals; and*

*controlling each of the channel currents based at least in part on a first reference signal, a second reference signal, the output voltage, the one or more scaled channel current signals, and one of the plurality of channel current signals.*

*20. A control circuit for a multi-phase DC/DC converter having an output voltage, the control circuit comprising:*

*an scaling circuit, responsive to a plurality of channel current signals representative of channel currents for a plurality of channels, that scales a sum of the values of the plurality of channel current signals to produce one or more scaled signals;*

*an error amplifier, responsive to at least the output voltage and a reference signal, the error amplifier providing an output that includes at least a common error signal; and*

*a plurality of pulse width modulator circuits, each responsive to the common error signal, the one or more scaled signals, one of the plurality of channel current signals, and a second reference signal to produce a plurality of pulse width modulated signals to control the plurality of channels of the multi-phase DC/DC converter.*

*21. The control circuit of claim 20 wherein the scaling circuit further includes a summing circuit to add the plurality of channel current signals to produce the sum.*

*22. The control circuit of claim 20, further comprising:*

*a signal combiner circuit responsive to at least the one or more scaled signals from the scaling circuit and producing an output signal; and*

*wherein at least one of the plurality of pulse width modulator circuits has at least a first input responsive to the output signal of the signal combiner circuit.*

*23. The control circuit of claim 22, wherein each pulse width modulator circuit has a second input responsive to the second reference signal.*

*24. A control circuit for a multi-phase DC/DC converter having an output voltage, the control circuit comprising:*

*a scaling circuit, responsive to a plurality of channel current signals representative of channel currents for a plurality of channels, that scales a value of the plurality of channel current signals to produce one or more scaled signals;*

*an error amplifier, responsive to the output voltage and a reference signal, the error amplifier providing an output including at least one error signal; and*

*a plurality of pulse width modulator circuits, each responsive to the at least one error signal, the one or more scaled signals, one of the plurality of channel current signals, and a second reference signal to produce a plurality of pulse width modulated signals to control the plurality of channels of the multi-phase DC/DC converter.*

*25. A control circuit for a multi-phase DC/DC converter having an output voltage, the control circuit comprising:*

*a scaling circuit, responsive to a plurality of channel current signals representative of channel currents for a plurality of channels, that scales a value of the plurality of channel current signals to produce one or more scaled signals; and*

*a plurality of pulse width modulator circuits, each responsive to the output voltage and a reference signal, the one or more scaled signals, one of the plurality of channel current signals, and a second reference signal to produce a plurality of pulse width modulated signals to control the plurality of channels of the multi-phase DC/DC converter.*

*26. A method of balancing a plurality of channel currents, each of the plurality of channel currents flowing in a corresponding one of a plurality of channels in a multi-phase DC/DC converter, the DC/DC converter having an output voltage, the method comprising:*

*receiving a plurality of channel current signals, each of the plurality of channel current signals representative of a channel current for one of the plurality of channel currents;*

*averaging together the plurality of channel current signals to thereby determine one or more average channel current signals; and*

*controlling each of the channel currents based at least in part on the one or more average channel current signals, one of the plurality of channel current signals, a signal representative of the output voltage, a first reference signal, a second reference signal and a common error signal.*

* * * * *